United States Patent
Tan et al.

(10) Patent No.: US 7,651,155 B2
(45) Date of Patent: Jan. 26, 2010

(54) PROGRESSIVE ENERGY ABSORBER

(75) Inventors: Soo A. Tan, Shelby Township, MI (US); Giles D. Bryer, Plymouth, MI (US); Jonathan E. Rich, Clinton Townhip, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 298 days.

(21) Appl. No.: 11/556,325

(22) Filed: Nov. 3, 2006

(65) Prior Publication Data

US 2008/0106107 A1 May 8, 2008

(51) Int. Cl.
*B60R 19/34* (2006.01)

(52) U.S. Cl. .............. 296/187.03; 296/187.09; 296/193.09; 293/133

(58) Field of Classification Search ............ 296/187.03, 296/187.09, 187.12, 193.08, 193.09; 293/132, 293/133, 154
See application file for complete search history.

(56) References Cited

U.S. PATENT DOCUMENTS

| | | | |
|---|---|---|---|
| 3,981,114 A | 9/1976 | Chupick | |
| 4,272,114 A * | 6/1981 | Hirano et al. | 293/133 |
| 5,314,229 A * | 5/1994 | Matuzawa et al. | 296/187.09 |
| 6,270,131 B1 | 8/2001 | Martinez et al. | |
| 6,474,709 B2 * | 11/2002 | Artner | 293/133 |
| 6,554,176 B2 * | 4/2003 | McGill | 228/112.1 |
| 6,893,078 B2 | 5/2005 | Saeki | |
| 7,185,945 B2 * | 3/2007 | Dandekar et al. | 296/187.09 |
| 7,188,877 B2 * | 3/2007 | Gonzalez et al. | 293/133 |
| 7,188,890 B1 * | 3/2007 | Baccouche et al. | 296/187.03 |
| 7,290,811 B1 * | 11/2007 | Arns | 293/133 |
| 2001/0013706 A1 * | 8/2001 | Artner | 293/133 |
| 2002/0130160 A1 * | 9/2002 | McGill | 228/112.1 |
| 2005/0017543 A1 * | 1/2005 | Riley et al. | 296/187.03 |
| 2006/0028052 A1 * | 2/2006 | Dandekar et al. | 296/187.09 |
| 2006/0033363 A1 * | 2/2006 | Hillekes et al. | 296/187.09 |
| 2006/0066115 A1 * | 3/2006 | Haneda et al. | 293/133 |
| 2006/0096099 A1 * | 5/2006 | Cripsey et al. | 29/897.2 |
| 2006/0290150 A1 * | 12/2006 | Roll et al. | 293/133 |
| 2007/0056819 A1 * | 3/2007 | Kano et al. | 188/371 |

(Continued)

FOREIGN PATENT DOCUMENTS

DE 19959701 A1 6/2001

(Continued)

OTHER PUBLICATIONS

Machine translation of DE10359483 printed from the EPO website Jul. 19, 2009.*

*Primary Examiner*—Jason S Morrow

(57) ABSTRACT

An energy absorbing device includes a longitudinal extending tubular outer shell assembly tapered from a smaller end to a larger end so that upon the imposition of a longitudinal applied force on the ends thereof the tubular outer shell will collapse progressively from the smaller end toward the larger end. At least one reinforcing web is located within the tubular structure and is shorter in length than the tubular structure and has an end spaced from the one smaller end of the tubular structure that first collapses so that the web is subjected to progressive energy absorbing collapse only after the tubular outer shell assembly has begun to collapse. One or more such webs can be employed to sequentially and progressively collapse and deform to absorb the longitudinal applied force in a preferred manner.

21 Claims, 6 Drawing Sheets

U.S. PATENT DOCUMENTS

| | | | |
|---|---|---|---|
| 2007/0176442 A1* | 8/2007 | Mori et al. | 293/133 |
| 2007/0182176 A1* | 8/2007 | Muskos | 293/133 |
| 2008/0030031 A1* | 2/2008 | Nilsson | 293/133 |
| 2008/0116719 A1* | 5/2008 | Bae | 296/187.09 |
| 2008/0143144 A1* | 6/2008 | Yustick et al. | 296/187.03 |
| 2008/0224487 A1* | 9/2008 | Wang et al. | 293/132 |
| 2009/0001737 A1* | 1/2009 | Salomonsson | 293/133 |

FOREIGN PATENT DOCUMENTS

| | | |
|---|---|---|
| DE | 69532264 T2 | 10/2004 |
| DE | 10359483 A1 | 7/2005 |

* cited by examiner

PROGRESSIVE ENERGY ABSORBER

FIELD OF THE INVENTION

The present invention relates to an energy absorber and more particularly an energy absorber constructed of sheet metal stampings that progressively deform to absorb energy.

BACKGROUND OF THE INVENTION

It is known in the automobile industry to employ energy absorbing devices, particularly in the mounting of an impact bumper on the front and rear of motor vehicles. Many energy absorber constructions have been developed, and generally seek to provide effective and reliable absorption of energy at low cost and light weight.

It would be desirable to provide a new and improved energy absorber that is lightweight, economical to manufacture, and of a design that can be readily tuned to achieve the desired level of energy absorption.

SUMMARY OF THE INVENTION

An energy absorbing device includes a longitudinal extending tubular outer shell assembly tapered from a smaller end to a larger end so that upon the imposition of a longitudinal applied force on the ends thereof the tubular outer shell will collapse progressively from the smaller end toward the larger end. At least one reinforcing web is located within the tubular structure and is shorter in length than the tubular structure and has an end spaced from the one smaller end of the tubular structure that first collapses so that the web is subjected to progressive energy absorbing collapse only after the tubular outer shell assembly has begun to collapse. One or more such webs can be employed to sequentially and progressively collapse and deform to absorb the longitudinal applied force in a preferred manner.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
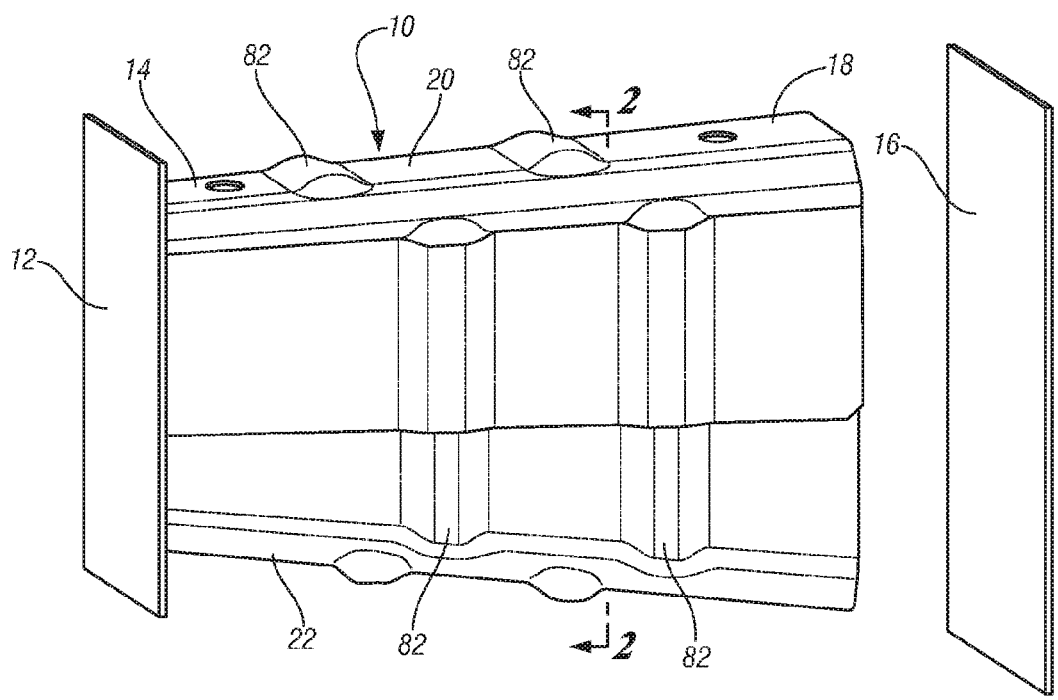
FIG. 1 is a perspective view of an energy absorber according to the invention.
Figure 2:
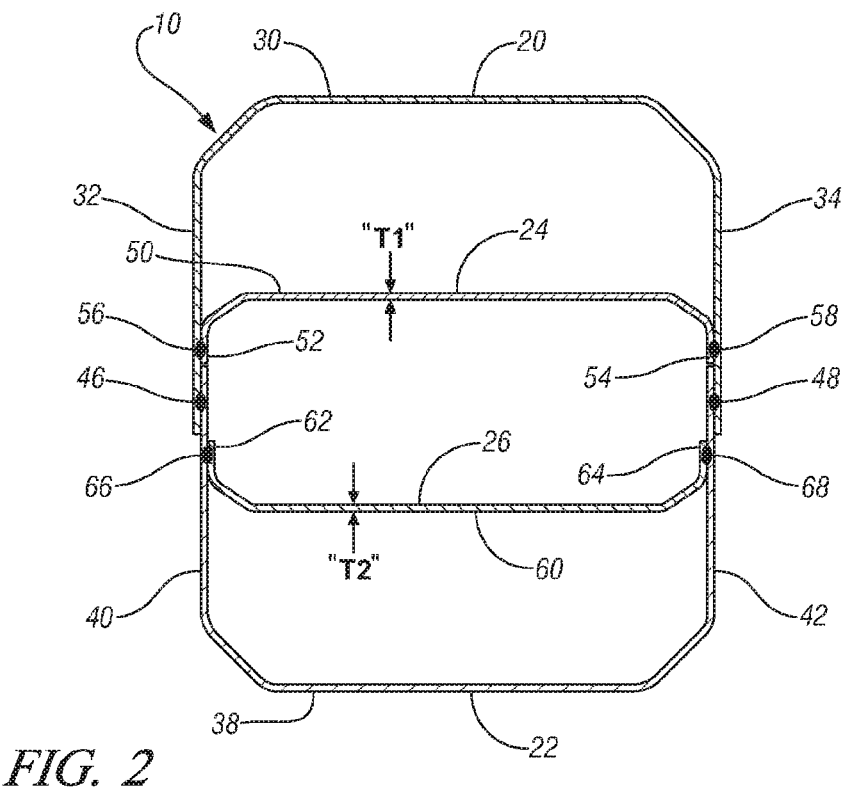
FIG. 2 is section view taken in the direction of arrows 2-2 of FIG. 1.
Figure 3:
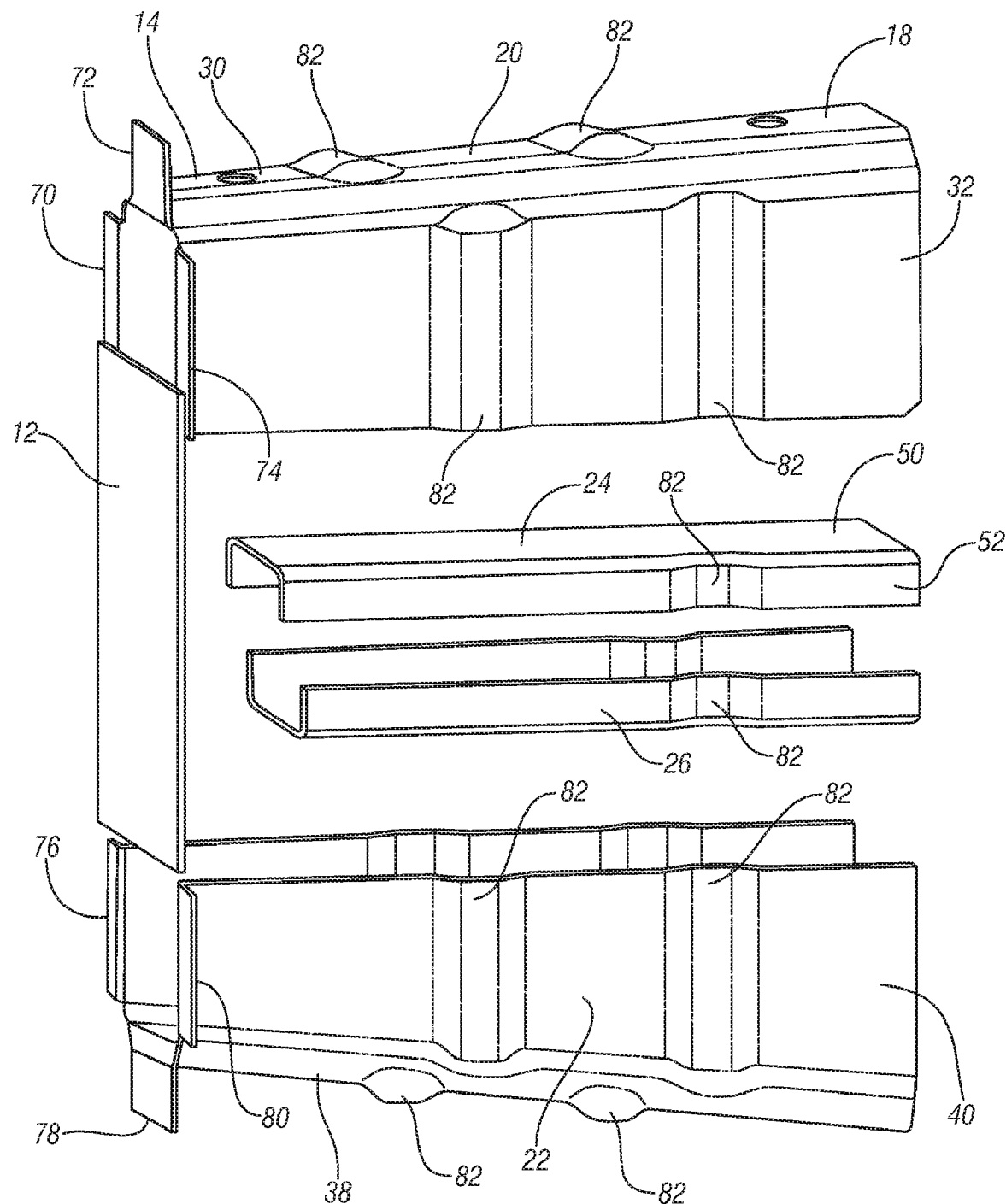
FIG. 3 is a an exploded view of the energy absorber of FIGS. 1 and 2.

Referring to FIGS. 1, 2 and 3, an energy absorber 10 is provided for installation in a motor vehicle. A front plate 12 at the front end 14 of the energy absorber 10 is attached to a front vehicle bumper, not shown, and a rear plate 16 at the rear end 18 of the energy absorber is attached to the vehicle frame rail, not shown. Each vehicle typically employs two of the energy absorbers 10, that is, one on the front right side of the vehicle and one on the front left side. Another pair of the energy absorbers may be employed to attach the rear bumper to the vehicle.

The energy absorber 10 is constructed of a number of stamped metal components and includes an upper shell 20, a lower shell 22, and reinforcing webs including an upper web 24 and lower web 26.

As best seen in FIG. 2, the upper shell 20 includes an upper wall 30 and side walls 32 and 34. The lower shell 22 includes a lower wall 38 and side walls 40 and 42. The upper shell 20 and the lower shell 22 are assembled together to form a tubular structure. In particular, the upper shell 20 and lower shell 22 are cupped together and a line of spot welds, such as spot weld 46, is made between the abutting side walls 32 and 40, and a line of spot welds, such as spot weld 48, is made between the abutting side walls 34 and 42.

As best seen in FIG. 2, the upper web 24 includes a web wall 50 and flanges 52 and 54 that are turned down at the edges of the web wall 50. The upper web 24 is attached to the upper shell 20 by a line of spot welds, such as the weld 56 made between the flange 52 and the side wall 32, and by a line of spot welds, such as the weld 58, made between the flange 54 and the side wall 34.

FIG. 2 also shows that the lower web 26 includes a web wall 60 and flanges 62 and 64 that are up-turned at the edges of the web wall 60. The lower web 26 is attached to the upper shell 20 by a line of spot welds, such as the weld 66 made between the flange 62 and the side wall 40, and by a line of spot welds, such as the weld 68, made between the flange 64 and the side wall 42.

As seen in FIG. 3, the upper web 24 and the lower web 26 are truncated at the front of the energy absorber so as to be shorter than the upper shell 20 and lower shell 22 and to thereby fall short of contact with the front plate 12.

The front 14 of the upper shell has mounting tabs 70, 72 and 74, and the front of the lower shell 22 has mounting tabs 76, 78 and 80, that are welded to the front plate 12. Similar mounting tabs, not shown, may be provided at the rear end of the upper shell 20 and lower shell 22 to facilitate attachment to the rear plate 16.

Figure 4:
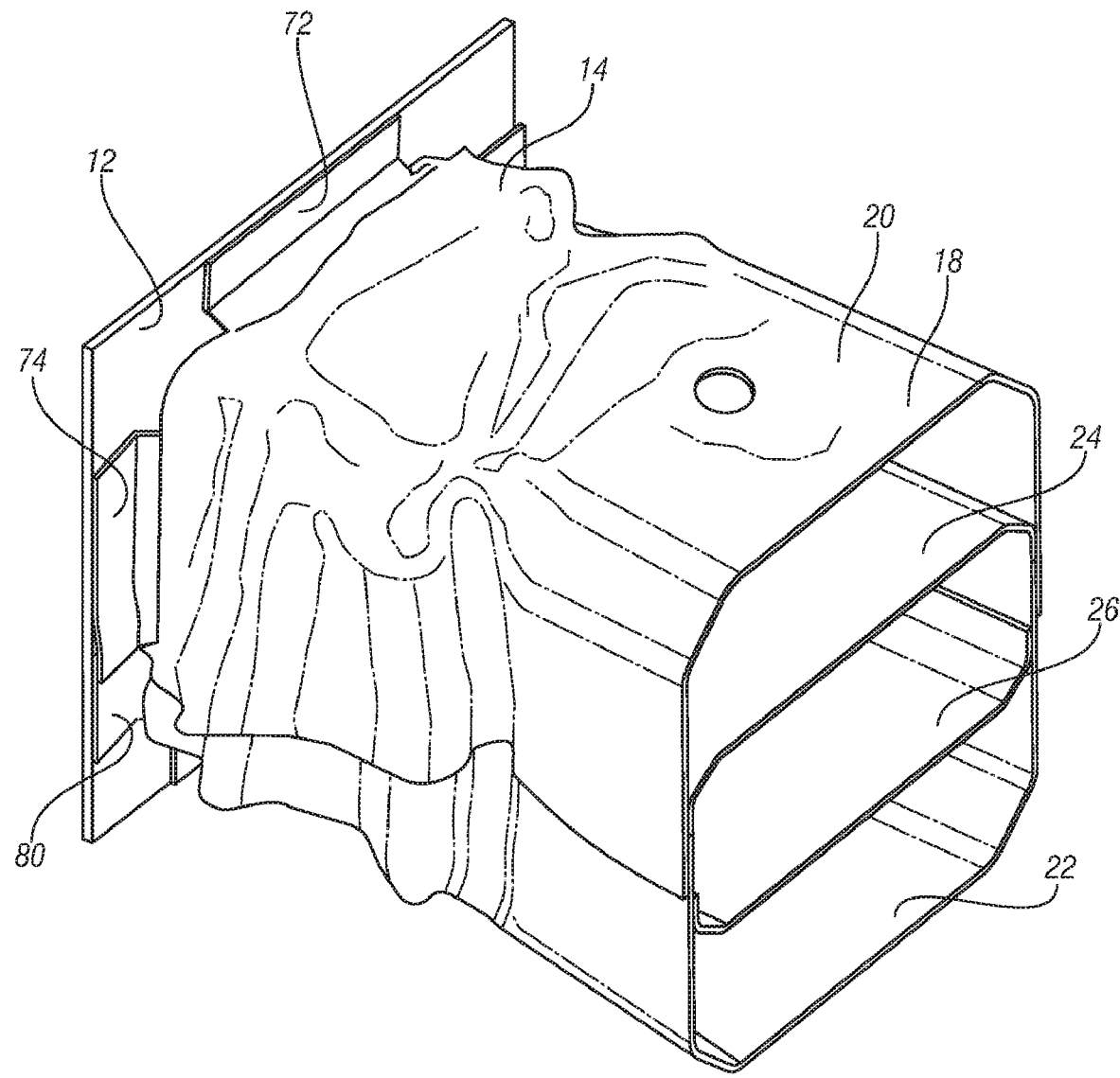
FIG. 4 is perspective view showing the energy absorber undergoing energy absorbing collapse and deformation.

FIG. 4 shows the energy absorber 10 undergoing collapse during an energy absorbing event in which compressive force applied against the front plate 12 and rear plate 16 exceed the columnar strength of the energy absorber 10. As seen in FIG. 4, the energy absorber 10 collapses and metal deformation is initiated at the front of the energy absorber 10 and progresses toward the rear. Referring again to FIGS. 1 and 3, it is seen that the shape and dimensions of the upper shell 20, lower shell 22, upper web 24 and lower web 26 are such that the energy absorber 10 has a tubular shape that is from a smaller cross-section at the front 14 to a larger cross section at the rear 18. In particular, the bottom wall 38 of the lower shell 22 is narrower in width at the front 14 than at the rear 18. The side walls 40 and 42 of the lower shell 22 are of lesser height at the front 14 than at the rear 18. The upper shell 20 is similarly shaped. In addition, the upper web 24 and the lower web 26 are narrower in width at the front 14 than at the rear 18. Furthermore, a plurality of collapse initiating controllers 82 are provided by preformed indents at strategic locations in the upper shell 20, lower shell 22, upper web 24 and lower web 26. These collapse initiating controllers 82, cooperating with the tapered shape of the energy absorber 10, serve to initiate the collapse at the front 14 and then conduct controlled collapse in a predictable front to rear progression during the energy absorbing event.

Figure 5:
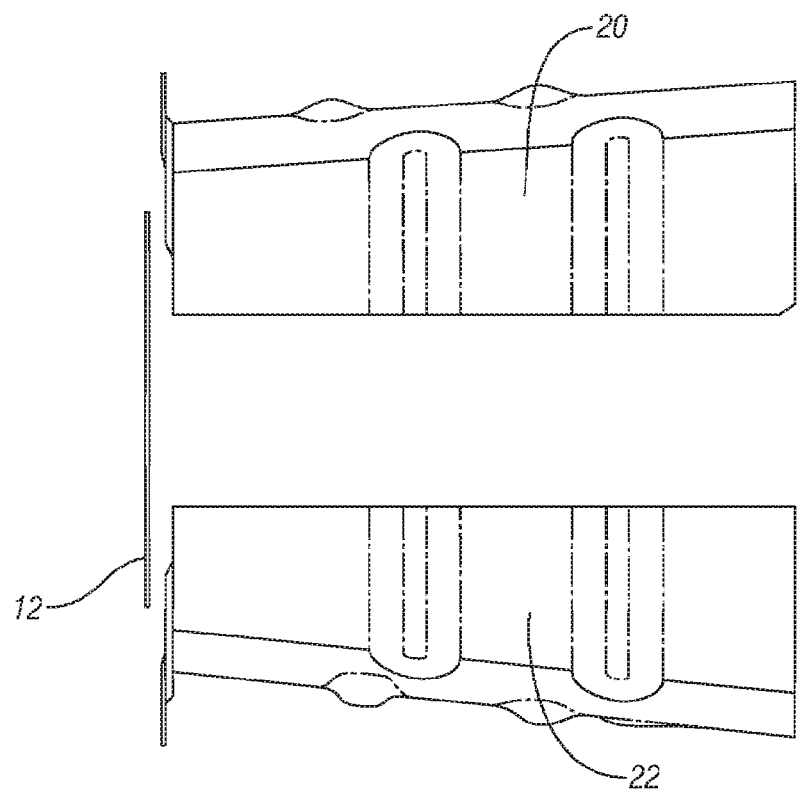
FIG. 5 is an exploded view of an energy absorber according to the prior art.

FIG. 5 shows an energy absorber comprised of an upper shell 20 and a lower shell 22, but having no upper or lower web.

Figure 6:
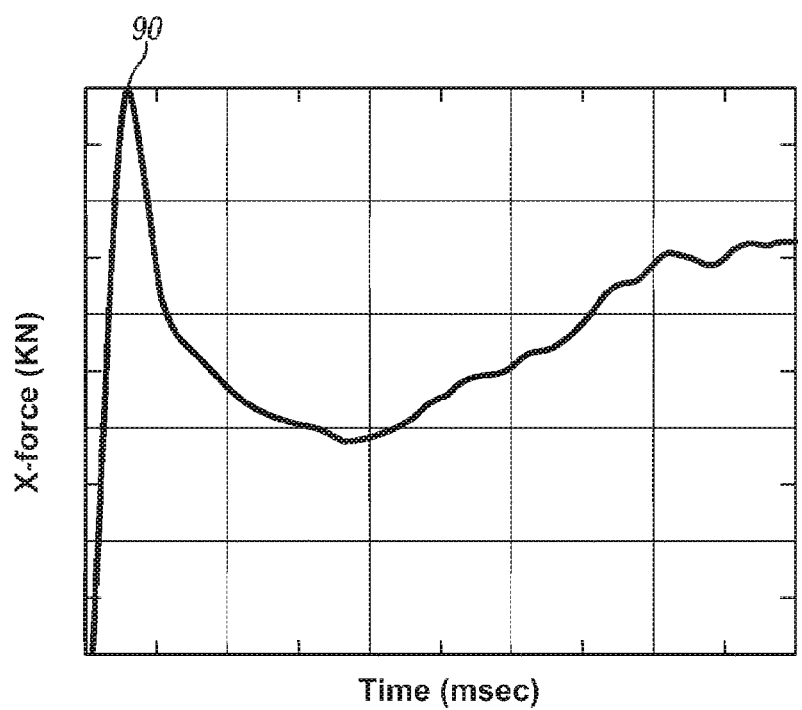
FIG. 6 is a graph of force versus time for the energy absorber of FIG. 5.

FIG. 6 is a graph of force versus time for the energy absorber of FIG. 5, and shows that the force quickly peaks at point 90 on the graph, and then levels off, until increasing again as the energy absorber reached its final stage of collapse. However, it is well known in the science of energy absorption for motor vehicles that the most efficient energy absorption is obtained when the force and displacement plot is a square wave, that is, the force is more nearly uniform over the time and distance of the energy absorbing collapse. Therefore it is desirable for the plot of force to be more generally horizontal and that the peaks and valleys are minimized.

Figure 7:
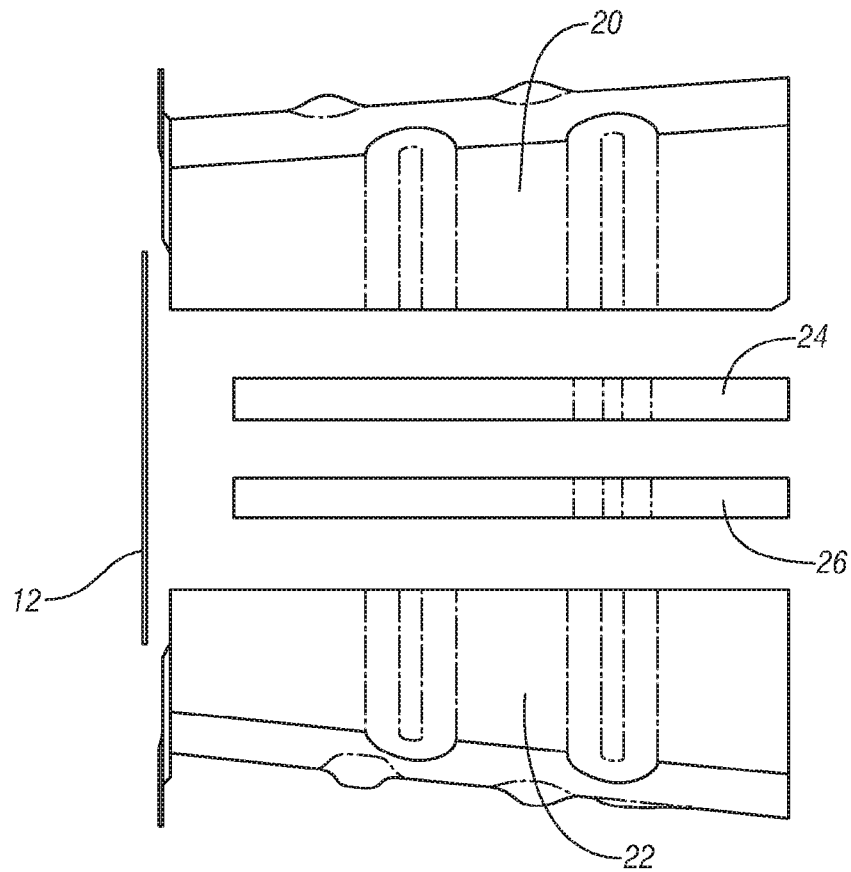
FIG. 7 is an exploded view of an energy absorber having a pair of webs according to the present invention.

FIG. 7 shows the energy absorber of FIGS. 1-3 in which a pair of truncated webs, including the upper web 24 and lower web 26 are located within the tubular structure of the upper shell 20 and lower shell 22. As seen in FIG. 7, upper web 24 and the lower web 26 are of the same length as each other, but shorter than the upper shell 20 and lower shell 22 so that the front ends of the upper web 24 and lower web 26 are spaced away from the front plate 12.

Figure 8:
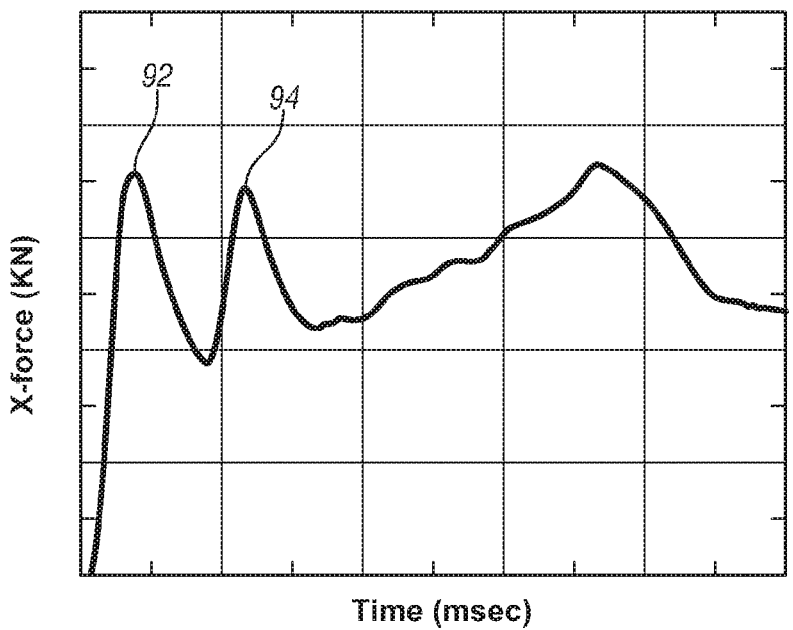
FIG. 8 is a graph of force versus time for the energy absorber of FIG. 7.

FIG. 8 is a graph of force versus time for the energy absorber of FIG. 5, and shows that the force quickly peaks at point 92 on the graph as the collapse is initiated, and begins to drop. However, when the front plate 12 engages with the front ends of the upper web 24 and lower web 26, the webs will resist and then begin to collapse so that the force will again peak at 94 and then level off again. Thus the force is more nearly constant than was the case in the example of FIGS. 5 and 6.

Figure 9:
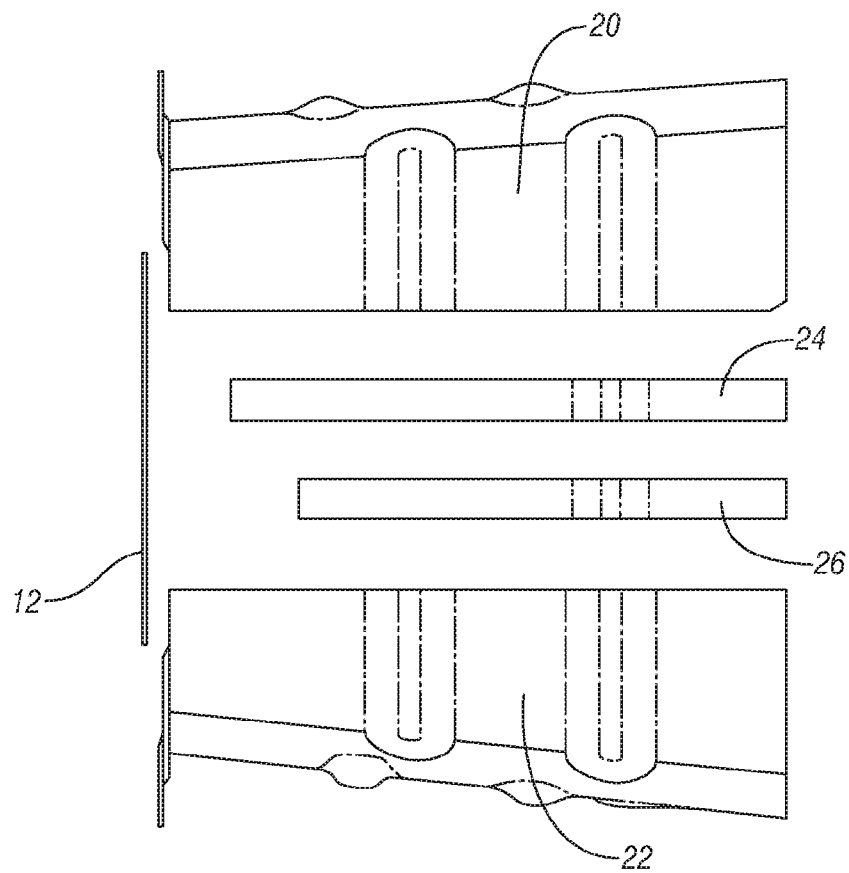
FIG. 9 is an exploded view of an energy absorber having a pair of webs according to the invention.

FIG. 9 shows an energy absorber in which a pair of truncated webs, including the upper web 24 and lower web 26 are located within the tubular structure of the upper shell 20 and lower shell 22. As seen in FIG. 9, the upper web 24 is shorter than the upper shell 20 and the lower shell 22. The lower web 26 is even shorter than the upper web 24. Thus the front end of the upper web 24 is spaced away from the front plate 12 and the front end of the lower web 26 is spaced even further away from the front plate 12.

Figure 10:
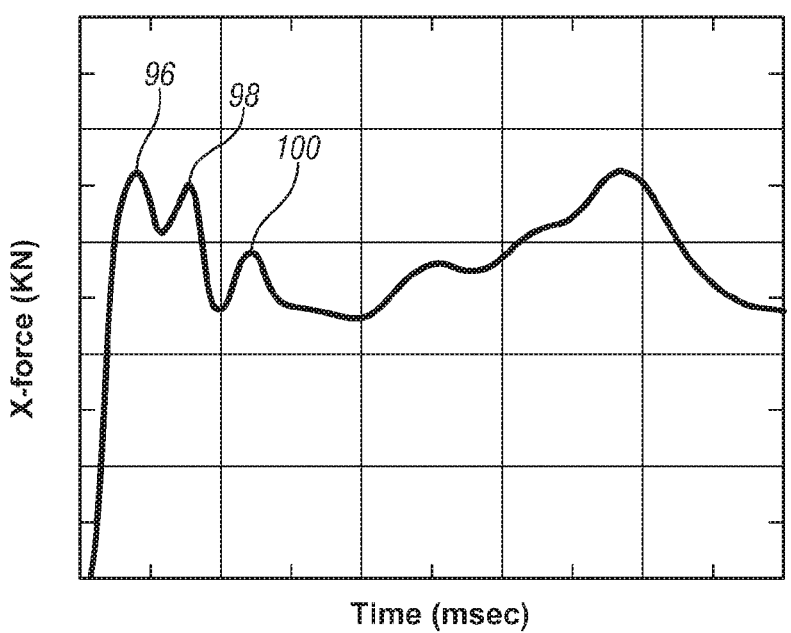
FIG. 10 is a graph of force versus time for the energy absorber of FIG. 9.

FIG. 10 is a graph of force versus time for the energy absorber of FIG. 9, and shows that the force quickly peaks at point 96 on the graph as the collapse is initiated, and begins to drop. However, when the front plate 12 engages with the ends of the upper web 24, the upper web 24 will resist and then begin to collapse so that the force will again peak at 98, and then begin to drop. And then when the front plate 12 engages with the end of the lower web 26, the lower web 26 will resist and then begin to collapse so that the force will again peak at 100 and then begin to drop, before rising again as the collapse reaches its final stage.

The foregoing description of the invention is merely exemplary in nature and, thus, variations thereof are intended to be within the scope of the invention. For example, although the drawing shows the example of the use of two webs, a single web may be used or two or more webs may be used. The distance by which the front of a particular web is spaced from the front plate will determine the point at which the web will begin to resist movement of the plate 12 and then begin to collapse and thereby influence the energy absorption. Furthermore, the webs can be further tuned by having the webs be of different material strength or thickness. Thus, in FIG. 2, the thickness "T1" of the upper web 24 can be the same or either equal to or greater or lesser than the thickness "T2" of the lower web 26. The number of crush initiators 82 provided in the shells and the webs, and the location of the crush initiators may also be varied to enable tubing of the energy absorber.

It will be understood that the front plate 12 and the rear plate 16 may be assembled as by welding to the energy absorber 10, or in the alternative, the automobile bumper may serve as the front plate 12 and the vehicle frame may serve as the rear plate 16. If desired, the energy absorber 10 can be arranged to have the crush be initiated at the rear end instead of the front end. In addition, the shells may be arranged as a left and right shell rather than the upper and lower shells as shown in the drawings. In addition, the webs may be arranged to either extend horizontally as shown in the drawings or vertically.

Thus it is seen that by selecting the number of the truncated reinforcing webs that are added to the tubular structure, and by tailoring the length and other characteristics of the webs, the energy absorber can be designed to provide a force and displacement characteristic that meets the needs of a particular energy absorption challenge.

What is claimed is:

1. An energy absorber comprising:
a first shell and a second shell, each shell having longitudinal extending edge portions engaging with corresponding edge portions of the other shell and attached thereto so that the shells cooperate to form a tubular structure having opposed walls defined by the shells, said tubular structure having longitudinally spaced ends adapted to receive force applied in the longitudinal direction;
a plurality of webs located within the tubular structure, said webs being channel shaped with a wall extending in the longitudinal direction and longitudinal extending edge flange portions attached to opposing walls of the tubular structure;
whereby a longitudinal force applied to the tubular structure causes longitudinal collapse of the tubular structure and the longitudinal collapse of the webs including both the walls and the edge flange portions to absorb the longitudinal applied force;
said plurality of webs being of varying length from one another and each of the plurality of webs being spaced from the longitudinal end of the tubular structure so that upon progressive collapse of the energy absorber the first and second shells collapse initially and then the plurality of webs are serially engaged and deformed to contribute serially to the energy absorption.

2. The energy absorber of claim 1 in which at least one of the plurality of webs is of different metal thickness than at least one of the other of the plurality of webs.

3. The energy absorber of claim 1 in which a front plate and a rear plate are attached respectively to the front and rear ends of the first and second shells and the plurality of webs are spaced away from contact with the front plate but become engaged thereby during collapse of the first and second shells.

4. The energy absorber of claim 1 in which collapse initiating controllers are formed in the first and second shells and at least one of the webs.

5. The energy absorber of claim 1 in which a front plate and a rear plate are attached respectively to the front and rear ends of the first and second shells.

6. The energy absorber of claim 1 in which collapse initiating controllers are formed in the first and second shells and a front plate and a rear plate are attached respectively to the front and rear longitudinal spaced ends of the first and second shells.

7. The energy absorber of claim 6 in which collapse initiating controllers are also formed in at least one of the plurality of webs.

8. An energy absorber comprising:
a longitudinal extending tubular outer shell assembly tapered from a smaller end to a larger end so that upon the imposition of a longitudinal applied force on the ends thereof the tubular outer shell will collapse progressively from the smaller end toward the larger end;
a plurality of webs located within the tubular outer shell assembly and of varying length from one another and each of the plurality of webs has a longitudinal wall and longitudinal extending edge portion welded to the inside of the tubular outer shell assembly and each of the plurality of webs is shorter in length than the tubular outer shell assembly and spaced from the longitudinal end of the tubular outer shell assembly at the smaller end thereof so that upon progressive collapse of the energy absorber the upper and lower shells collapse initially and then the plurality of webs are serially engaged and deformed to contribute serially to the energy absorption only after the tubular outer shell assembly has begun to collapse.

9. The energy absorber of claim 8 in which the tubular outer shell assembly is comprised of first and second shells welded together.

10. An energy absorber comprising:
a first shell and a second shell, each shell having longitudinal extending edge portions engaging with corresponding edge portions of the other shell and attached thereto so that the shells cooperate to form a tubular structure having opposed walls defined by the shells, said tubular structure having longitudinally spaced apart ends adapted to receive force applied in the longitudinal direction and being configured to collapse initially at one end of the tubular structure and to then collapse progressively toward the other end of the tubular structure;
a first web having longitudinal extending edge flange portions attached to the opposed walls of the tubular structure;
a second web having longitudinal extending edge flange portions attached to the opposed walls of the tubular structure;
the first and second webs being of different length from one another and having ends spaced from the one end of the tubular structure that initially collapses.

11. The energy absorber of claim 10 in which one webs is of different metal thickness than the other web.

12. The energy absorber of claim 10 in which a front plate and a rear plate are attached respectively to the front and rear ends of the first and second shells and the webs are spaced away from contact with the front plate but become engaged thereby during collapse of the first and second shells.

13. The energy absorber of claim 10 in which collapse initiating controllers are formed in the first and second shells and at least one of the webs.

14. The energy absorber of claim 10 in which collapse initiating controllers are formed in the first and second shells and each of the webs.

15. The energy absorber of claim 10 in which a front plate and a rear plate are attached respectively to the front and rear ends of the first and second shells.

16. The energy absorber of claim 10 in which collapse initiating controllers are formed in the first and second shells and a front plate and a rear plate are attached respectively to the front and rear longitudinal spaced ends of the first and second shells.

17. The energy absorber of claim 16 in which collapse initiating controllers are also formed in at least one of the webs.

18. The energy absorber of claim 10 in which the first and second shells are tapered from a smaller end to a larger end so that the tubular structure is tapered.

19. The energy absorber of claim 18 in which a front plate and a rear plate are attached respectively to the front and rear ends of the first and second shells.

20. The energy absorber of claim 19 in which collapse initiating controllers are formed in the first and second shells.

21. The energy absorber of claim 20 in which collapse initiating controllers are formed in at least one of the webs.

* * * * *